Figure 1:
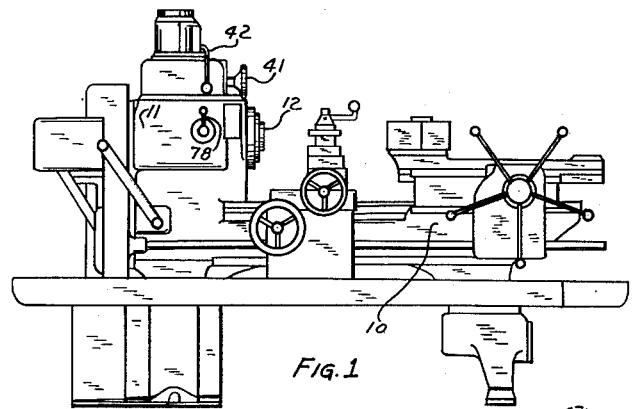

June 19, 1951     F. M. TOMLINSON     2,557,324
MACHINE TOOL TRANSMISSION
Filed June 14, 1945     2 Sheets-Sheet 1

INVENTOR.
FAY M. TOMLINSON
BY Kwis, Hudson, Boughton & Williams
ATTORNEYS

June 19, 1951  F. M. TOMLINSON  2,557,324
MACHINE TOOL TRANSMISSION
Filed June 14, 1945  2 Sheets-Sheet 2

INVENTOR.
FAY M. TOMLINSON
BY Kwis, Hudson, Boughton + Williams
ATTORNEYS

Patented June 19, 1951

2,557,324

UNITED STATES PATENT OFFICE 2,557,324

MACHINE TOOL TRANSMISSION

Fay M. Tomlinson, Lakewood, Ohio, assignor to The Warner & Swasey Company, Cleveland, Ohio, a corporation of Ohio Application June 14, 1945, Serial No. 599,438

16 Claims. (Cl. 74—740)

This invention relates to a machine tool transmission and although the invention may be applied to various types of machine tools having change speed gearing, it will be described herein by way of illustration as applied to the headstock of a lathe.

An object of the invention is to provide in a machine tool having a part to be moved at different rates and change speed gearing for varying the rate of movement of said part, means for facilitating the shifting of said change speed gearing to vary the rate of said part and whereby when said gearing is shifted it can be readily intermeshed without clashing.

Another object is to provide in a machine tool having a movable part and change speed gearing for varying the rate of movement of said part, means for effecting a slow power driven non-working movement of said change speed gearing preparatory to the shifting thereof to change the rate of said part.

Anoter object is to provide in a machine tool having a movable part and change speed gearing for varying the rate of movement of said part and means for connecting and disconnecting said change speed gearing to and from a power source, improved and novel means for imparting to said change speed gearing from said power source independently of said connecting and disconnecting means a slow non-working drive to facilitate the shifting of said gearing, means for braking the movement of said part when said connecting and disconnecting means is in disconnected position, means for reversing the drive of said change speed gearing from said power source, independently of said connecting and disconnecting means, and a single control member controlling all of said means including said connecting and disconnecting means.

Another object is to provide in a machine tool having a movable part and a change speed transmission for moving said part at different rates, a power source, and a clutch mechanism for connecting and disconnecting said transmission to and from said power source; means including planetary gearing for imparting independently of said clutch mechanism a slow driven movement to said transmission from said power source to facilitate the shifting of the shiftable elements of the transmission, a reverse driven movement thereto, or for applying a braking action to the movement of said transmission and said part.

Another object is to provide in a machine tool such as defined in the last named object, fluid actuated means for controlling said clutch mechanism and said planetary gearing and which fluid actuated means is controlled by a single control member, so functioning that said slow drive, said reverse drive and said braking action can be obtained only when said clutch mechanism is disengaged.

Another object is to provide in a machine tool having a movable part, change speed gearing for moving said part at different rates and means for connecting and disconnecting said gearing to a power source; improved means for imparting a slow non-working drive to said gearing and which improved means is so constructed that it produces a minimum amount of heat in its operation.

Another object is to provide in a machine tool having a movable part, change speed gearing for moving said part at different rates, a power driven shaft, and a clutch for connecting said shaft to said gearing for the forward drive of the gearing; a unit operatively associated with said shaft for imparting a slow non-working drive to said gearing independently of said clutch and for applying a braking action to said gearing and said part, said unit also including provision for imparting a reverse drive to said gearing independently of said clutch, wherefore said clutch can be a simple forward clutch.

A further object is to provide an arrangement for accomplishing the hereinbefore specified objects and which is inexpensive and relatively small and compact.

Further and additional objects and advantages not hereinbefore referred to will become apparent hereinafter during the detailed description of an embodiment of the invention which is to follow.

Referring to the accompanying drawings,

Fig. 1 is a front elevational view of a machine tool to which the invention may be applied, the machine tool being shown herein by way of illustration as a lathe.

Figure 2:
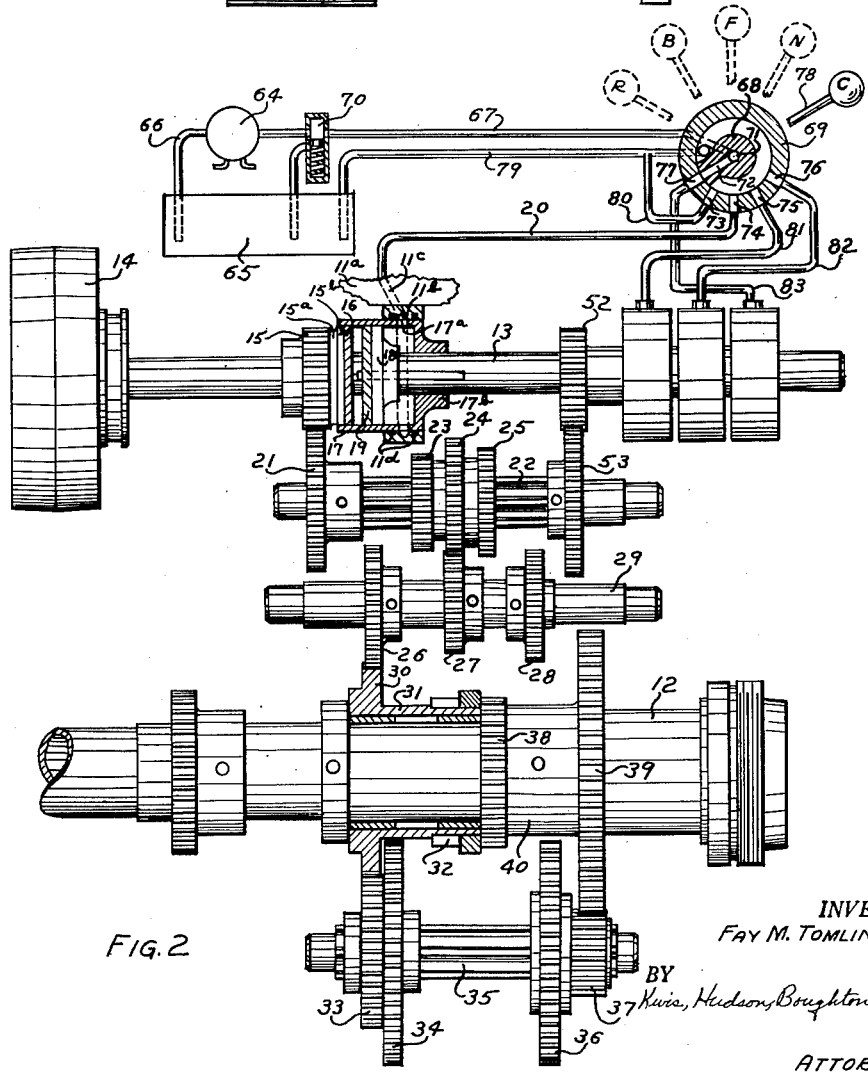

Fig. 2 is a developed view of the change speed transmission or gearing in the headstock of the lathe for driving the work spindle at a plurality of different speeds, together with a showing partly in elevation and partly in section of the forward clutch means on the main drive shaft, the arrangement for imparting reverse drive to said change speed gearing or for imparting a slow non-working forward drive thereto, the means for applying a braking action to said gearing and said spindle, and the fluid control for said clutch and all of said means.

Figure 3:
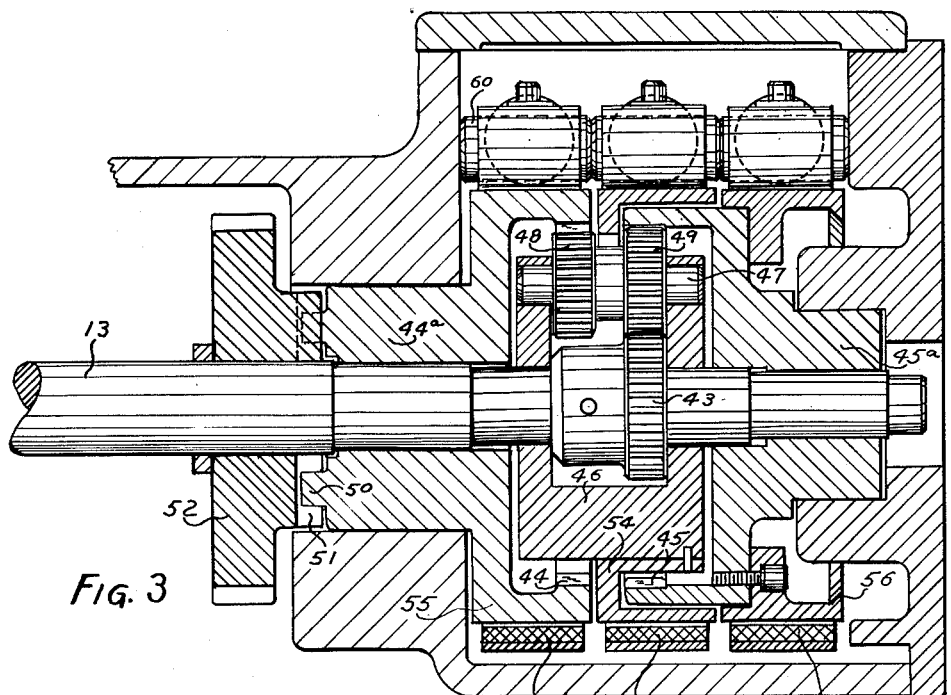
Figure 4:
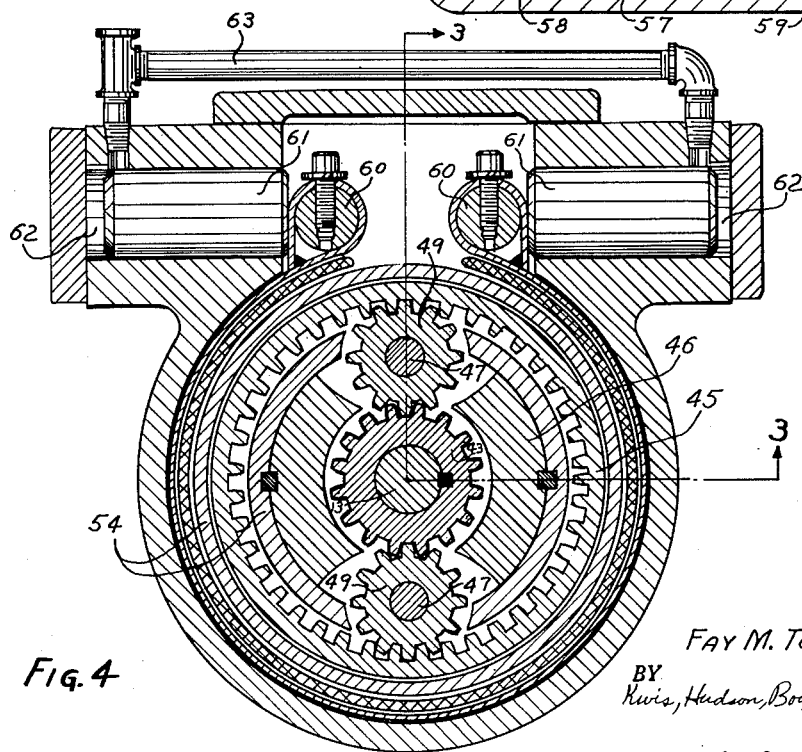

Fig. 3 is a longitudinal sectional view through the planetary gear unit embodying the invention and which is arranged on the main drive shaft in the headstock and is taken substantially on irregular line 3—3 of Fig. 4 looking in the direction of the arrows, and Fig. 4 is a transverse sectional view through said planetary gear unit.

The lathe shown in Fig. 1 comprises a bed 10, having at one end a headstock 11 in which is rotatably mounted a movable part, in this instance the spindle 12. It will be understood that the bed 10 of the lathe is provided with suitable ways on which one or more slides move toward and away from the headstock in timed relation to the rotation of the spindle but since this forms no part of the present invention further reference to this part of the lathe construction is unnecessary. The movable part or spindle 12 has a plurality of different working speeds imparted thereto as will be well understood in the art and a change speed transmission for this purpose is disclosed in Fig. 2.

A main power source or drive shaft 13 is rotatably supported in the headstock 11 in suitable bearings and said shaft, in this instance, is driven by a belt, not shown, from a motor in the base of the machine and which belt extends around a pulley 14 fixed on the shaft. The shaft 13 is provided with a gear 15 held against axial movement but freely rotatable on the shaft and said gear is shown for purposes of illustration as provided on one side thereof with an integral hub 15a having a disk portion 15b provided with friction clutch facing material 16. The headstock 11 is provided internally with a bearing bracket ring 11a, the inner circumference of which has an annular groove 11b communicating with a passage 11c in the ring. If desired packing sealing rings 11d may be carried by the ring 11a on each side of the groove 11b. A cylinder 17 rotatably fits the inner circumference of the ring 11a and is provided with one or more ports 17a placing the interior of the cylinder in communication with the groove 11b. The disk portion 15b of the gear 15 also rotatably interfits the cylinder 17. The cylinder 17 has a hub portion 17b which is keyed to the shaft 13 wherefore the cylinder rotates with said shaft. A piston 18 is located within the cylinder 17 and is splined to the shaft 13 for endwise movement relative to said shaft and the cylinder 17 and for rotation therewith. The piston 18 is provided on its side adjacent to the gear 15 with friction clutch facing material 19 adapted to cooperate with the material 16 to operatively frictionally interconnect the piston 18 and gear 15 to cause said gear to rotate with the shaft 13. The piston 18 is moved into clutch engaged position by fluid pressure which enters the cylinder 17 through a conduit 20 connected with the passage 11c and the groove 11b. The disk portion 15b, facing material 16, piston 18 and facing material 19 constitute a forward drive clutch for connecting and disconnecting the power source and the transmission to obtain a forward working drive of the transmission.

The gear 15 is constantly in mesh with a gear 21 fixed to a shaft 22 rotatably supported in the headstock and which has splined thereto a shiftable element in the form of a three-step gear cone consisting of the gears 23, 24 and 25. The three-step gear cone can be shifted axially of the shaft 22 to intermesh the gear 23 with a gear 26 or the gear 24 with a gear 27, or the gear 25 with a gear 28. The gears 26, 27 and 28 are fixed to a shaft 29 rotatably supported in the headstock. The gear 26 constantly intermeshes with a gear 30 formed on one end of a sleeve 31 which is freely rotatable on the spindle 12 but is held against axial movement relative thereto. The sleeve 31 is also provided with a gear 32.

A shiftable element in the form of a rear two-step gear cone formed of the gears 33 and 34 is splined to a shaft 35 rotatably supported in the headstock and said rear two-step gear cone can be axially shifted to intermesh the gear 33 with the gear 30 or the gear 34 with the gear 32. The shaft 35 also has splined thereto a shiftable element in the form of a front two-step gear cone formed of the gears 36 and 37 and said front two-step gear cone can be shifted axially to intermesh the gear 36 with the gear 38 or the gear 37 with the gear 39 and which gears 38 and 39 are formed in this instance integral with a sleeve 40 fixed to the spindle 12.

From the foregoing it will be seen that the spindle 12 can be driven at any one of twelve working speeds from the shaft 13 through the clutch and in one direction i. e., the forward direction.

The three-step gear cone, the rear two-step gear cone and the front two-step gear cone can be shifted by any suitable shifting means so as to change the speed of rotation of the spindle as will be well understood in the art. As illustrative of a form of means which can be employed for shifting the gear cones, reference is made to Lange Patent No. 2,068,552, issued January 19, 1937, and wherein the headstock is provided with spools splined to an indexible shaft and movable toward and away from each other on said shaft. These indexible spools are provided on their adjacent faces with series of actuating projections and can be indexed with said shaft in correlation to the different spindle speeds and while the spools are separated. The spools can then be moved toward each other to cause the projections to actuate elements which are operatively connected with the gear cone and shifting mechanisms.

Referring to Fig. 1, the dial 41 effects the indexing of the shaft and spools referred to, as shown in said Lange Patent No. 2,068,552, while the lever 42 effects the endwise movement of the spools to separate the same for indexing purposes and to move the same toward each other to bring about the shifting of the gear cones. Of course any other suitable and well known means may be employed for shifting the gear cones in order to change the speed of the spindle, it being understood that such shifting of the gear cones should occur only when the piston 18 is not held in clutch engaging position by the pressure fluid.

In order that a reverse drive may be imparted to the change speed transmission and the spindle from the shaft 13 independently of the main forward clutch, a slow non-working drive may be imparted to said change speed transmission and spindle from said shaft 13 independently of said main clutch to facilitate the shifting and intermeshing of the gears in the transmission without clashing and that a braking action may be applied to said transmission and said spindle and all under the control of a single control member which also controls the main forward clutch on the shaft 13, the following mechanism is employed.

The main drive shaft 13 is extended beyond the clutch mechanism hereinbefore described, i. e., to the right thereof, as viewed in Figs. 2 and 3 and the extended portion of the shaft 13 has mounted thereon an internal planetary gear unit housed either in the headstock or in a separate casting secured to the headstock.

The main drive shaft or power source 13 which is constantly rotating in the forward direction during the operation of the machine has fixed thereto a sun gear 43 which constitutes the driving member of the planetary gear unit (see Fig. 3). The unit also includes internal gears 44 and 45 spaced axially of the shaft 13 and provided with hub portions 44a and 45a freely rotatable on the shaft 13 and rotatable within suitable bearing supports formed in the headstock or in the separate casting as the case might be. It will be understood that the internal gear 44 is smaller than the internal gear 45 by a number of teeth for a purpose well understood in the art.

A planet gear carrier 46 is freely rotatable on the shaft 13 intermediate the hub portions 44a and 45a and internally of the internal gears 44 and 45 and said carrier 46 fixedly supports diametrically located shafts 47, on each of which the integral planet gears 48 and 49 are freely rotatable. The planet gears or pinions 48 are smaller than the planet gears or pinion 49 by a number of teeth as will be readily understood. The smaller planet gears 48 mesh with the smaller internal gear 44, while the larger planet gears 49 mesh with the larger internal gear 45 and also with the sun gear 43.

The hub portion 44a of the internal gear 44 is provided at its left hand end as viewed in Fig. 3 with clutch teeth 50 engaging clutch teeth 51 formed on the adjacent side of a gear 52 that is freely rotatable on the shaft 13 but is held against axial movement thereon. The gear 52 constantly meshes with a gear 53 fixed to the shaft 22, see Fig. 2.

The planet gear carrier 46 has fixed to its outer periphery a brake drum 54 of substantially U-shape in cross section, so as to straddle the internal gear 45, as clearly indicated in Figs. 3 and 4. The external circumference of the internal gear 44, as indicated at 55, constitutes a brake drum, while the internal gear 45 has secured to it a brake drum 56. That is, the unit includes three brake drums, namely 54, 55 and 56, with the drum 54 connected to the planet gear carrier 46 and the drums 55 and 56 formed on or connected with the internal gears 44 and 45.

Brake bands of the external contracting type surround the brake drums 54, 55 and 56 and said brake bands are indicated, respectively, at 57, 58 and 59 and include brake lining material and metal strips supporting the same, with the free ends of the strips bent around and secured to pins 60, see Fig. 4, the ends of which pins contact each other and the inner wall of the support for the unit. The brake bands, in other words, float but are held against axial displacement and surround their respective brake drums and can be contracted into engagement with said drums by pressing the pins 60 of each brake band toward each other to contract the metal strip and cause the brake material to grip the brake drum. Each of the brake bands is contracted by means of aligned plungers 61 contacting the free ends of the metal strips which surround the pins 60 as clearly indicated in Fig. 4. The plungers 61 are slidable in cylinders 62 formed in the headstock or in the separate casting supporting the unit. The outer ends of the cylinders 62 are in communication with openings to which a conduit 63 is connected. It will be understood that the construction just described is the same for each brake band and that when pressure fluid is admitted to the cylinders 62 through the conduit 63 the plungers 61 are moved inwardly to contract the brake bands.

The contraction of brake band 57 effects reverse drive of the change speed gearing independently of the main clutch on the shaft 13; the contraction of the brake band 58 effects a braking action to stop the rotation of the change speed gearing and the spindle and the contraction of the brake band 59 effects independently of said main clutch the slow non-working forward drive to the change speed gearing to facilitate the shifting of the gears without clashing.

Assuming that the friction clutch previously described on the shaft 13 is engaged and the change speed transmission is being driven from the shaft 13 in the forward direction at a working speed and that all of the brake bands are in released or expanded position, the planetary gear unit will then be functioning as follows: the sun gear 43 will be rotating the planet gears 48 and 49 and these gears will be rolling around the internal gears 44 and 45 and the carrier 46 will be slowly turning. The internal gear 44 will also be rotating due to its connection with the gear 52 which is in mesh with the gear 53 on the shaft 22. The internal gear 45 will be slowly and idly revolving. The planetary gear unit at this time will have no effect on the drive to the change speed transmission. Before describing the manner in which the planetary gear unit functions the means for controlling the friction clutch on the shaft 13 and for contracting the brake bands 57, 58 and 59 will first be described.

The clutch is actuated and the brake bands contracted by fluid pressure means which is shown in this instance as hydraulic means. A pump 64 has its intake connected with a reservoir 65 by means of a conduit 66, while its outlet is connected by a conduit 67 with a rotatable valve member 68 mounted in a valve housing 69. A suitable relief valve 70 is associated with the conduit 67 and with the reservoir 65. The conduit 67 communicates with a central bore 71 in a rotatable valve member 68 and said bore communicates with a radially extending passage 72 adapted to be selectively placed in communication by the rotation of the valve member 68 with any one of radially extending ports 73, 74, 75, 76 and 77 formed in the valve housing 69. The valve member 68 is rocked or rotated by means of a handle 78 operatively connected to the valve member and located on the front of the headstock, see Figs. 1 and 2. The interior of the valve housing 69 is in communication with the reservoir 65 through an exhaust conduit 79. The port 73 is also in communication with the exhaust conduit 79 through a conduit 80. The conduit 20 which extends to the friction clutch on the shaft 13 is in communication with the port 74 of the valve housing 69. The port 75 of the valve housing 69 is in communication with a conduit 81 which extends to and is connected with the conduit 83 of the contracting mechanism for the brake band 58. The port 76 of the valve housing 69 is in communication with a conduit 82 that extends to and communicates with the conduit 63 of the mechanism for contracting the brake band 57 (see Fig. 4). The port 77 of the valve housing 69 is in communication with a conduit 83 that extends to and is connected with the conduit 63 of the mechanism for contracting the brake band 59.

It will be seen that when the valve handle 78 is in position N of Fig. 2 the pressure liquid is flowing through the valve member 68 outwardly through the port 73, conduit 80 and conduit 79 back to the reservoir 65. At this time the fricclutch is disengaged and all of the brake bands are in released or expanded position. This position of the valve handle 78 is a neutral position wherein no power drive is being imparted to the change speed transmission.

Assuming that the operator desires to impart a working forward drive to the change speed transmission and the spindle he moves the valve handle 78 from position N to position F to connect the passage 72 of the valve member 68 with the port 74 and with the conduit 20 to cause the pressure liquid to flow into the cylinder 16 and move the piston into clutch engaged position, whereupon the gear 15 rotates the gear 21 and the transmission and spindle are driven in the forward direction.

Assuming that the operator wishes to change the forward speed of the spindle, he moves the handle 78 from position F to position N and continues such movement to position C to cause the passage 72 of the valve member 68 to register with the port 77 and be in communication with the conduit 83. This causes the plungers 61 of the actuating mechanism for the brake band 59 to be moved to contract said brake band and arrest the rotation of the internal gear 45. The sun gear 43 is at this time driving the planet gears 48 and 49 to rotate the free running internal gear 44 which is operatively connected through the gears 52 and 53 with the shaft 22. This results in a slow non-working forward drive being imparted to the shaft 22 and the change speed transmission and during this slow drive the operator can shift the gear cones without clashing by manipulating the lever 42 and the slowly rotating gears will readily intermesh.

It will be noted that the sun gear 43 rotating in a forward direction rotates the planet gears 48 and 49 on their axes in a reverse direction. However, since planet gears 49 are rotating in mesh with internal gear 45 which is held against rotation, the carrier 46 rotates in a forward direction. The reverse rotation of planet gear 48 on its axis tends to turn the internal gear 44 in a forward direction since pinions 48 are smaller than pinions 49. Consequently the internal gear 44 rotates in the forward direction with the sun gear 43 but at a greatly reduced speed.

Assuming that the shiftable gear cones have now been shifted, the operator moves the valve handle 78 from position C through position N to position F to release the brake band 59 and effect engagement of the friction clutch on the main drive shaft 13. The transmission and the spindle will now be rotating in the forward direction at the new speed.

Assuming that the operator wishes to stop the forward rotation of the spindle and to apply the brake, he moves the handle 78 from position F to position B and this causes the passage 72 of the valve member 68 to align with the port 75 of the valve housing 69 and to be in communication with the conduit 81, whereupon brake band 58 is contracted by its actuating mechanism and internal gear 44, hub portion 44a thereof and gear 52 are held against turning movement, since at this time the friction clutch on the main shaft 13 is disengaged. It will be seen that the rotation of the change speed gearing and the spindle 12 is also braked, due to the intermeshing of the gear 52 with the gear 53 on the shaft 22 of the transmission.

Assuming that the operator wishes to impart a reverse drive to the change speed transmission and to the spindle 12, he moves the valve handle 78 from position B to position R to bring the passage 72 of the valve member 68 into registry with the port 76 and in communication with the conduit 82, to operate the actuating mechanism for the brake band 57 to contract the same and hold the planet gear carrier 46 against rotative movement, and hence stop the orbit rotation of planet gears 48 and 49 and change the function of said gears into differential idler gears. Therefore the forward rotation of the sun gear 43 imparts a reverse rotation to the planet gears 48 and 49 and since the planet gears 48 act merely as internal pinions the internal gear 44 is driven thereby in a reverse direction and through the gear 52 imparts a reverse drive to the change speed transmission.

Although a preferred embodiment of the invention has been illustrated and described herein it will be understood that the invention is susceptible of various modifications and adaptations within the scope of the appended claims.

Having thus described my invention, I claim:

1. In a machine tool having a movable part, a drive shaft, a change speed transmission for moving said part at different rates of working movement, operative connections between said transmission and said shaft including a forward clutch for connecting and disconnecting said shaft and said transmission, means for actuating said clutch, a planetary gear unit including a gear rotatable by said shaft independently of said forward clutch, a gear carrier surrounding said gear and freely rotatable relative thereto, axially spaced planet gears carried by and freely rotatable in said carrier with one of said planet gears constantly in mesh with said first named gear, spaced internal gears meshing with said planet gears and freely rotatable relative to each other and to said first named gear and said carrier, operative connections between said transmission and said planetary gear unit and including one of said internal gears and a positive unbroken drive train from said one internal gear to said transmission drums carried by said carrier and by each of said internal gears, holding means operatively associated with each of said drums, and means for selectively actuating said holding means to selectively hold said carrier or the other of said internal gears against rotation to impart to said transmission when said forward clutch is disengaged either a slow non-working speed or a working reverse drive or to hold said one internal gear against rotation to stop rotation of said operative connections and thus apply a braking action to said transmission to stop rotation of the same.

2. In a machine tool having a movable part, a power source, a change speed transmission for moving said part at different rates of working movement and including shiftable elements, a forward drive clutch for connecting and disconnecting said power source and said transmission for forward working speed operation of the latter, a planetary gear unit including a sun gear, spaced internal gears, and a carrier supporting planetary gears meshing with said sun gear and said internal gears, said sun gear being operatively connected to said power source independently of said forward clutch, means operatively connecting one of said internal gears to said transmission, and means for holding another of said internal gears stationary when said forward drive clutch is disengaged to impart to said transmission from said power source and through said unit a slow nonworking speed of movement to facilitate shifting of said shiftable elements of the transmission.

3. In a machine tool having a movable part a power source, a change speed transmission for moving said part at different speeds of working movement and including shiftable elements, a main forward clutch for connecting and disconnecting said power source and said transmission for imparting forward working speed operation of the latter, a planetary gear unit including a sun gear, spaced internal gears, and a carrier supporting planetary gears meshing with said sun gear and said internal gears, said sun gear being operatively connected to said power source independently of said forward clutch, means for operatively connecting one of said internal gears to said transmission, means for selectively holding another of said internal gears or said carrier stationary when said forward clutch is disengaged to selectively impart to said transmission from said power source and through said unit a slow nonworking speed of movement to facilitate shifting of said shiftable elements or for imparting to said transmission through said unit from said power source a reverse working speed of movement.

4. In a machine tool having a movable part, a power source, a change speed transmission for moving said part at different speeds of working movement and including shiftable elements, a forward drive clutch for connecting and disconnecting said power source and said transmission for imparting to the latter a forward working speed movement, a planetary gear unit including a sun gear, spaced internal gears, and a carrier supporting planetary gears meshing with said sun gear and said internal gears, said sun gear being operatively connected with said power source independently of said forward clutch, means for operatively connecting one of said internal gears with said transmission, and means for selectively holding said one internal gear stationary when said forward clutch is disengaged to apply a braking action to said transmission or for holding another of said internal gears stationary to impart to said transmission through said unit from said power source a slow nonworking rate of movement to facilitate shifting of said shiftable elements.

5. In a machine tool having a movable part, a power source, a change speed transmission for moving said part at different rates of working movement and including shiftable elements, a forward drive clutch for connecting and disconnecting said power source and said transmission to impart forward working movement to the latter, a planetary gear unit including a sun gear, spaced internal gears, and a carrier supporting planetary gears meshing with said sun gear and said internal gears, said sun gear being operatively connected with said power source independently of said forward clutch, means for operatively connecting one of said internal gears with said transmission, and means for selectively holding said one internal gear stationary when said forward clutch is disengaged to apply a braking action to said transmission or to hold said carrier stationary when said forward clutch is disengaged to impart to said transmission from said power source a reverse working movement.

6. In a machine tool having a movable part, a power source, a change speed transmission for moving said part at different rates of working movement and including shiftable elements, a forward drive clutch for connecting and disconnecting said power source and said transmission for forward working movement of the latter, a planetary gear unit including a sun gear, spaced internal gears, and a carrier supporting planetary gears meshing with said sun gear and said internal gears, said sun gear being operatively connected with said power source independently of said forward clutch, means for operatively connecting one of said internal gears with said transmission, and means for selectively holding one or the other of said internal gears or said carrier stationary when said forward clutch is disengaged to apply to said transmission a braking action or to impart to said transmission from said power source through said unit a slow nonworking rate of movement or to impart to said transmission from said power source through said unit a reverse working movement.

7. In a machine tool having a movable part, a power source, a change speed transmission for moving said part at different rates of working movement and including shiftable elements, a forward drive clutch for connecting and disconnecting said power source and said transmission to impart to the latter a forward working rate of movement, a planetary gear unit including a sun gear, spaced internal gears, and a carrier supporting planetary gears meshing with said sun gear and said internal gears, said sun gear being operatively connected with said power source independently of said forward clutch, means for operatively connecting one of said internal gears with said transmission, means for hodling another of said internal gears stationary when said forward clutch is disengaged to impart to said transmission from said power source through said unit a slow nonworking rate of movement to facilitate shifting of said shiftable elements, control means for said forward clutch, control means for said internal gear holding means, and a common control device for both of said control means.

8. In a machine tool having a movable part, a power source, a change speed transmission for moving said part at different rates of working movement and including shiftable elements, a forward drive clutch for connecting and disconnecting said power source and said transmission for imparting forward working movement to the latter, a planetary gear unit including a sun gear, spaced internal gears, and a carrier supporting planetary gears meshing with said sun gear and said internal gears, said sun gear being operatively connected with said power source independently of said forward clutch, means for connecting one of said internal gears with said transmission, means for holding another of said internal gears stationary when said forward clutch is disengaged to impart to said transmission from said power source through said unit a slow nonworking rate of movement to facilitate shifting of the shiftable elements, means for holding said carrier stationary when said forward clutch is disengaged to impart to said transmission from said power source through said unit a reverse working movement, means for controlling said forward clutch, means for controlling said internal gear holding means, means for controlling said carrier holding means, and a common control device for all of said control means.

9. In a machine tool having a movable part, a power source, a change speed transmission for moving said part at different rates of working movement and including shiftable elements, a forward drive clutch for connecting and disconnecting said power source and said transmission to impart forward working movement to the latter, a planetary gear unit including a sun gear, spaced internal gears, and a carrier supporting planetary gears meshing with said sun gear and said internal gears, said sun gear being connected with said power source independently of said forward clutch, means for connecting one of said internal gears with said transmission, means for holding said one internal gear stationary when said forward clutch is disengaged to apply a braking action to said transmission, means for holding another of said internal gears stationary when said forward clutch is disengaged to impart to said transmission from said power source through said unit a slow nonworking rate of movement to facilitate shifting of said shiftable elements, means for controlling said forward clutch, separate means for controlling both of said internal gear holding means, and a common control device for all of said control means.

10. In a machine tool having a movable part, a power source, a change speed transmission for moving said part at different rates of working movement and including shiftable elements, a forward drive clutch for connecting and disconnecting said power source and said transmission for imparting forward working movement to the latter, a planetary gear unit including a sun gear, spaced internal gears, a carrier supporting planetary gears meshing with said sun gear and said internal gears, said sun gear being connected with said power source independently of said forward clutch, means connecting one of said internal gears with said transmission, means for holding said one internal gear stationary when said forward clutch is disengaged to apply a braking action to said transmission means for holding said carrier stationary when said forward clutch is disengaged to impart to said transmission from said power source through said unit a reverse working movement, means for controlling said forward clutch, means for controlling said internal gear holding means, means for controlling said carrier holding means, and a common control device for all of said control means.

11. In a machine tool having a movable part, a power source, a change speed transmission for moving said part at different rates of working movement, a forward drive clutch for connecting and disconnecting said power source and said transmission for imparting to the latter a forward working movement, a planetary gear unit including a sun gear, spaced internal gears and a carrier supporting planetary gears meshing with said sun gear and said internal gears, said sun gear being connected with said power source independently of said forward clutch, means connecting one of said internal gears with said transmission, separate means functioning when said forward clutch is disengaged for holding said one internal gear stationary or for holding another internal gear stationary or for holding said carrier stationary for applying a braking action to said transmission or a slow nonworking movement thereto or a reverse working movement thereto, means for controlling said forward clutch, separate means for controlling said separate holding means, and a common device for controlling all of said control means.

12. In a machine tool having a movable part, a power source, a change speed transmission for moving said part at different rates of working movement in either the forward or reverse direction and including shiftable members, a disengageable drive clutch for connecting said power source and said transmission for forward working speed operation of the latter, a planetary gear unit having as elements thereof a sun gear, spaced internal gears, and a carrier supporting planetary gears meshing with said sun gear and said internal gears, one of said unit elements being operatively connected to said power source independently of said clutch, means operatively connecting a second of said unit elements to said transmission, and means for holding a third of said unit elements stationary when said drive clutch is disengaged to impart to said transmission from said power source and through said unit a slow non-working forward speed of movement to facilitate shifting of said shiftable members of the transmission.

13. In a machine tool having a movable part, a power source, a change speed transmission for moving said part at different speeds of working movement in either the forward or reverse direction and including shiftable members, a disengageable drive clutch for connecting said power source and said transmission for imparting forward working speed operation to the latter, a planetary gear unit having as elements a sun gear, spaced internal gears and a carrier supporting planetary gears meshing with said sun gear and said internal gears, one of said unit elements being operatively connected to said power source independently of said clutch, means for operatively connecting a second of said unit elements to said transmission, means for selectively holding a third or a fourth element of said unit stationary when said clutch is disengaged to selectively impart to said transmission from said power source and through said unit a slow forward non-working speed of movement to facilitate shifting of said shiftable members or for imparting to said transmission from said power source a reverse working speed of movement.

14. In a machine tool having a movable part, a power source, a change speed transmission for moving said part at different speeds of working movement in either the forward or reverse direction and including shiftable members, a disengageable drive clutch for connecting said power source and said transmission for imparting to the latter a forward working speed movement, a planetary gear unit having as elements a sun gear, spaced internal gears and a carrier supporting planetary gears meshing with said sun gear and said internal gears, one of said unit elements being operatively connected with said power source independently of said clutch, means for operatively connecting a second of said unit elements with said transmission, and means for selectively holding said second element stationary when said clutch is disengaged to apply a braking action to said transmission or for holding a third unit element stationary to impart to said transmission from said power source and through said unit a slow forward non-working rate of movement to facilitate shifting of said shiftable elements.

15. In a machine tool having a movable part, a power source, a change speed transmission for moving said part at different rates of working movement in either the forward or reverse direction and including shiftable members, a disengageable drive clutch for connecting said power source and said transmission to impart forward working movement to the latter, a planetary gear unit having as elements a sun gear, spaced internal gears and a carrier supporting planetary gears meshing with said sun gear and said internal gears, one of said unit elements being operatively connected with said power source independently of said clutch, means for operatively connecting a second of said unit elements with said transmission, and means for selectively holding said second element stationary when said one direction clutch is disengaged to apply a braking action to said transmission or to hold a third unit element stationary when said clutch is disengaged to impart to said transmission from said power source a reverse working movement.

16. In a machine tool having a movable part, a power source, a change speed transmission for moving said part at different rates of working movement in either the forward or reverse direction and including shiftable members, a disengageable drive clutch for connecting said power source and said transmission for forward working movement of the latter, a planetary gear unit having as elements a sun gear, spaced internal gears and a carrier supporting planetary gears meshing with said sun gear and said internal gears, one of said unit elements being operatively connected to said power source independently of said clutch, means for operatively connecting a second of said unit elements with said transmission, and means for selectively holding said second unit element or a third or fourth unit element stationary when said clutch is disengaged to apply to said transmission a braking action or to impart to said transmission from said power source through said unit a slow forward non-working rate of movement or to impart to said transmission from said power source through said unit a reverse working movement.

FAY M. TOMLINSON.

REFERENCES CITED

The following references are of record in the file of this patent:

UNITED STATES PATENTS

| Number | Name | Date |
|---|---|---|
| Re. 17,090 | Thompson | Sept. 25, 1928 |
| 436,072 | Baldwin | Sept. 9, 1890 |
| 642,594 | Finlay | Feb. 6, 1900 |
| 1,159,018 | Hall | Nov. 2, 1915 |
| 1,588,004 | Blood | June 8, 1926 |
| 2,110,173 | Pohl et al. | Mar. 8, 1938 |
| 2,164,884 | Nenninger et al. | July 4, 1939 |

FOREIGN PATENTS

| Number | Country | Date |
|---|---|---|
| 457,442 | France | Sept. 17, 1913 |